United States Patent [19]

Kawabata

[11] Patent Number: 5,249,473
[45] Date of Patent: Oct. 5, 1993

[54] AUTOMATICALLY ADJUSTING ACTUATOR UNIT

[75] Inventor: Yukio Kawabata, Tokyo, Japan

[73] Assignee: Matsushita Electric Industrial Co., Ltd., Osaka, Japan

[21] Appl. No.: 731,730

[22] Filed: Jun. 21, 1991

[30] Foreign Application Priority Data

Jun. 27, 1990 [JP] Japan .................. 2-169010

[51] Int. Cl.⁵ .................. G01N 35/00; B65J 15/00
[52] U.S. Cl. .................. 73/865.9; 901/31
[58] Field of Search .................. 73/865.8, 865.9; 198/339.1; 29/705, 795, 787; 901/7, 31; 414/744.6, 744.7

[56] References Cited

U.S. PATENT DOCUMENTS

| | | | |
|---|---|---|---|
| 3,183,599 | 5/1965 | Byrd et al. | 73/865.9 |
| 3,597,981 | 10/1969 | Wakabayashi et al. | 73/865.9 |
| 4,188,166 | 2/1980 | Moreau et al. | 414/744.7 |
| 4,557,655 | 12/1985 | Berg | 198/339.1 |
| 4,632,632 | 12/1986 | Simone | 414/744.7 |
| 4,673,075 | 6/1987 | Ueyama et al. | 198/339.1 |
| 4,903,534 | 2/1990 | Kane | 73/865.9 |
| 4,905,527 | 3/1990 | Harth et al. | 73/865.8 |
| 5,020,278 | 6/1991 | St Angelo, Jr. et al. | 901/7 |

FOREIGN PATENT DOCUMENTS 0160407 11/1985 European Pat. Off.
0235045 9/1987 European Pat. Off.
1293996 4/1969 Fed. Rep. of Germany.

Primary Examiner—Hezron E. Williams
Assistant Examiner—Michael Brock
Attorney, Agent, or Firm—Stevens, Davis, Miller & Mosher

[57] ABSTRACT

An actuator unit in which an actuator section including a chuck pawl for adjusting a dial knob of a product on a line conveyer is moved in an X-Y plane by an X-Y axis servo mechanism, and the torque of the chuck pawl is adjusted by a torque adjusting mechanism while the operation of the torque actuator section is controlled by a control device which receives input data concerning the product that has been introduced onto the line conveyer. The actuator section is set to a position suitable for adjusting the product on the line conveyer, and further, the torque of the chuck pawl is adjusted to a suitable value for turning the dial knob of the product.

2 Claims, 7 Drawing Sheets

AUTOMATICALLY ADJUSTING ACTUATOR UNIT

BACKGROUND OF THE INVENTION

The present invention relates to an actuator for adjusting or inspecting button switches or dial knobs of a product which is transferred on a production line conveyer.

DESCRIPTION OF THE RELATED ART

An actuator unit of the above-mentioned type used in the past comprises a pusher device pushing a button switch of a product transferred on a production line conveyer, a chuck device chucking a dial knob of the product, and a rotation control device rotating the chuck device.

FIG. 8 shows an outline of a conventional actuator unit such as mentioned above as a whole.

In the figure, a pusher device 2 includes an air cylinder device 3, and a cylinder body 4 is fixed to a housing plate 6. When air is supplied to the cylinder body 4, a piston rod 8 moves forward, thereby pushing a push button switch not shown. In case the product to be investigated or inspected has a plurality of push button switches, a required plural number of air cylinders are provided (such as 3A, 3B indicated in the figure).

A chuck device 10 and a rotation control device 12 are fixedly mounted on a movable plate 14. The movable plate 14 is fixed to a linear guide 16, which is adapted to be able to move along a rail 18 fixed on the housing plate 6. An air cylinder device 20 is provided for moving the linear guide, and when air is supplied to an air cylinder body 22, a piston rod 24 is pushed forward, thereby advancing the linear guide 16 along the rail 18.

At the tip of a motor shaft 28 of a rotation control motor 26, which is fixed to the movable plate 14, is provided a pawl holding section 30 having a cylindrical shape, at the tip of which are provided two chuck pawls 32. Each of the chuck pawls 32 is fitted to the pawl holding section 30 with a gap therebetween by means of connecting pins 34. Between the two chuck pawls 32 is provided a spring 36, which urges the chuck pawls in the chuck opening direction. The outer diameter of the rear portion of each chuck pawl is equal to that of the outer surface of the pawl holding section 30, and as going forward, gradually increases, thereby forming a diverging conical surface 37. On the outer surface of the pawl holding portion is mounted a sliding member 38, which is adapted to slide forward and backward by the help of an opening and closing air cylinder 42 which is fixed to the movable plate 14 and which moves rod 40.

The operation of the above-mentioned actuator unit of prior art will be described below. When a product to be adjusted or inspected is transferred to the position of the actuator unit and a button switch of the product is intended to be pushed, the cylinder body 4 of the pusher device 2 is supplied with air, whereby the piston rod 8 moves forward. Through this process, the tip of the piston rod 8 can contact the push button switch and push forward the same.

In case of adjusting or inspecting a dial knob of a product, a cylinder body 20 of an air cylinder 22 is supplied with air, thereby advancing the movable plate 14. Then, the opening and closing air cylinder 42 is supplied with air, thereby pushing the sliding member 38 via rod 40 and closing the chuck pawls 32 against the opening force of the spring 36, thereby chucking the dial knob. After this, the chuck pawls 32 are rotated by the rotation control motor 26 through the motor shaft 28. Thus, the dial knob is rotated.

The above-mentioned conventional actuator unit is, however, required to provide a plurality of pusher devices 3, 3A, 3B . . . corresponding to the number of the push button switches of a product to be adjusted or inspected, and a plurality of chuck devices 10 and rotation control devices 12 in the number corresponding to the number of the dial knobs of the product. Therefore, when the products to be transferred on the line conveyer are changed so that the positions and number of push button switches or rotation switches is also changed, design changes are required as to pusher device 2, chuck device 10 and rotation control device 12 in order to deal with such different kinds of products. Further, since the rotating torque of a dial knob such as a volume knob differs among different products, it is required to select a rotation control motor or a gear box which can cope with this different rotating torque.

When a common rotation control motor is used, there is caused a problem relating to the strength of the stopper of dial knobs. In case of dealing with dial knobs having various diameters, the chucking diameter of a chuck device is required to be set as so to cope with the diameter of the knob. In view of these problems, automation of adjusting or inspecting processes for products on a production line conveyer encounters a difficulty wherein the pusher device 2, the chuck device 10 or the rotation control device 12 constituting an actuator unit must be changed so as to cope with different kinds of products, thereby requiring a shut down of the production line conveyer to make such changes, thus lowering the availability factor of the conveyor.

BRIEF SUMMARY OF THE INVENTION

The object of the present invention is to provide an actuator unit which solves the above-mentioned problems, requires a small number of actuators even when the product has many push buttons or dial knobs, and is able to automatically adjust or inspect various kinds of products by using a single actuator unit without idling the product line conveyer.

For achieving the above-mentioned object, according to the present invention, there are provided a base mounted on an X-Y biaxial servo mechanism and movable in X- and Y-axial directions and an actuator section mounted on the base and being able to move forward in the Z-axis direction. The actuator section is composed of a pusher device pushing button switches of a product on the production line conveyer, a chuck device chucking the dial knob of the product, and a rotation control device rotating the chuck device. The pusher device includes a push rod movable forward and backward. The chuck device includes a plurality of chuck pawls connected with a tip portion of a hollow main shaft coaxially arranged on the outer surface of the push rod and adapted to swing to and from each other for opening and closing the chuck device, the chuck pawls being urged in opening directions by a spring, and an opening and closing mechanism having a slider slidable in the axial direction of the main shaft for opening or closing the chuck device, the slider being formed with a tapered surface which presses a tapered surface formed on the outer surfaces of the pawls. The rotation control device includes a rotation torque transmitting portion formed thereon with sliding surfaces for rotating the main shaft and torque adjusting mechanism provided with a spring which can control the surface pressure against the sliding surfaces.

In consequence, according to the present invention, even in such case that the product is replaced and the number or the positions of the push button switches or dial knobs are changed, the actuator portion can be moved instantaneously by means of the X-Y biaxial servo mechanism. Therefore, there are required only at least one pusher device, one chuck device, and one rotation control device. Further, since the push rod of the pusher device and the main shaft of the chuck device are arranged coaxially, the size of the actuator section becomes small. Accordingly, the mounting of an actuator section of the X-Y biaxial servo mechanism can be facilitated.

When the actuator section comes to a position in front of a button switch, the push rod moves forward with the pawls of the chuck device being opened and pushes a push button switch.

When the actuator section comes to a position in front of a dial knob, the actuator section moves in the Z-axial direction, and the tapered surface of the slider pushes the tapered surfaces of the chuck pawls with the chuck pawls being located at the position of the dial knob, thereby closing the chuck pawls to chuck the dial knob. The opening or closing amount of the chuck pawls can be easily controlled by adjusting the slide amount of the slider. After is, the main shaft is rotated in association with the rotation of the chuck pawls, thereby rotating the dial knob. At this moment, since the rotating torque for rotating the main shaft is transmitted through the sliding surfaces, an excessive torque is prevented from being applied on the dial knob. Further, since the surface pressure on the sliding surfaces can be controlled by the spring, it is not required to replace the rotation control motor, thus differing from the prior art systems.

Other objects, features and advantages of the present invention, in addition to those mentioned above, will be apparent from the following description of preferred embodiments of the invention with reference to the drawings in which:

BRIEF DESCRIPTION OF THE DRAWINGS

As shown in FIG. 6, a motor 58 is fixed to a frame body 54 through a bracket 56 at the outside thereof, the frame body 54 defining the periphery of the X-Y biaxial servo mechanism 52, and a gear 62 mounted on the motor shaft 58 of the motor 60 meshes with a gear 66 of a spline shaft 64. The spline shaft 64 is rotatably supported by the frame body 54 in the X-axial direction. Inside of the frame body 54, a ball screw 68 is rotatably disposed along the X-axial direction similarly to the spline shaft 64. The ball screw 68 is connected with a motor 72 through a coupling 70 at the outside of the frame body 54. The motor 72 is fixed to the outside of the frame body 54 through a bracket 74. The periphery of the spline shaft 64 engages with a spline nut 76, which rotatably supports one end portion of a beam 78. The other portion of the beam 78 is rotatably supported by a ball nut 80 which engages with the periphery of the ball screw 68. A timing belt 84 is wound at one end thereof around a timing pulley 82 which is fixed to the outer surface of the spline nut 76, and at the other end around an idling pulley 86 which is mounted on the other end of the beam 78. A base 88 is arranged movably along the beam 78, and fixed to a portion of the timing belt 84.

Figure 1:
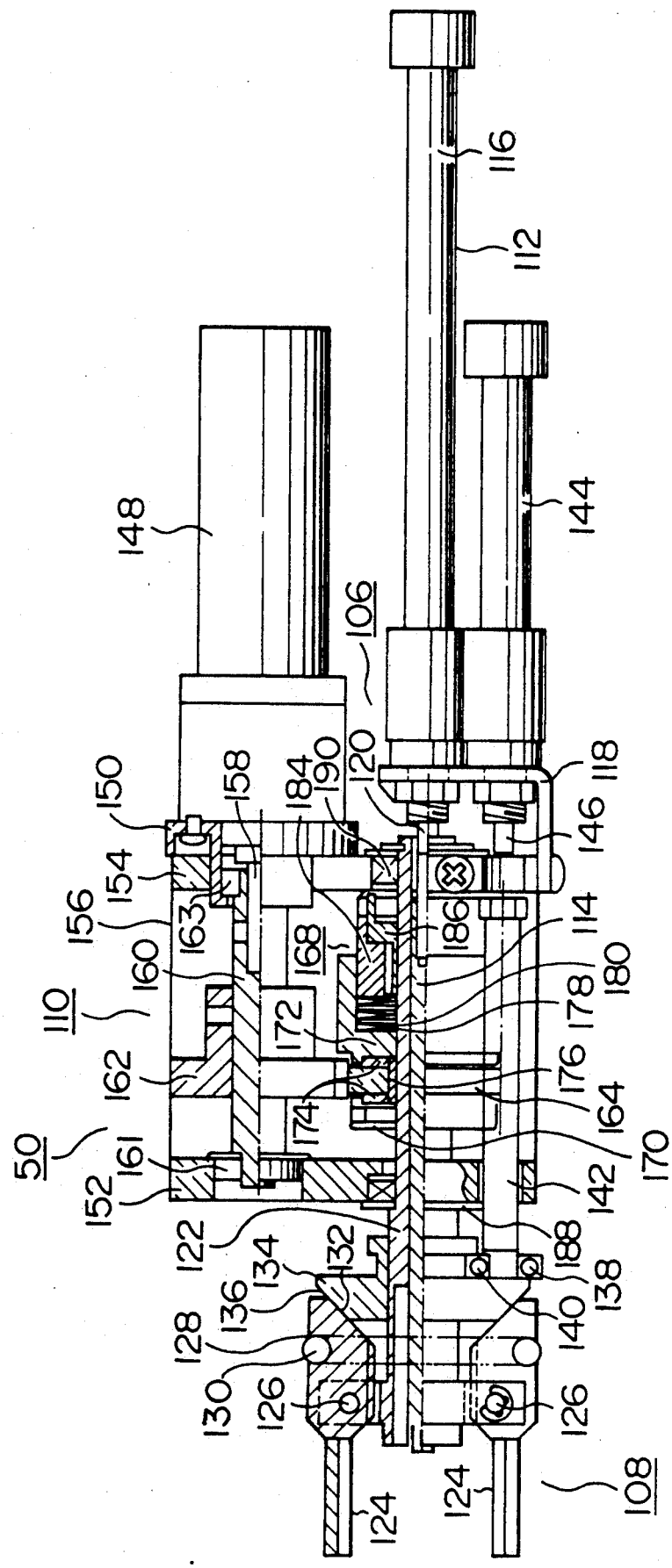
FIG. 1 is a view illustrating an automatic adjusting actuator unit in one embodiment of the present invention, which is partly sectioned.

In consequence, when the motor 58 located on the spline shaft 64 side is rotated, the spline shaft 64, spline nut 76, the timing pulley 82 and the idling pulley 86 rotate and the timing belt 84 takes a reciprocating motion in the Y-axial direction. Corresponding to this reciprocating motion, the base 88 receives a drawing force and moves along the beam 78 in the Y-axial direction. Next, when the motor 72 on the ball screw 68 side is rotated, the coupling 70 and the ball screw 68 rotate, and the ball nut 80 moves in the X-axial direction. Corresponding to this motion of the ball nut, the beam 78 moves in the X-axial direction under the guide of the spline shaft 64. Thus, the actuator section 50 mounted on the base 88 is able to rapidly move in X- and Y-axial directions.

Figure 3:
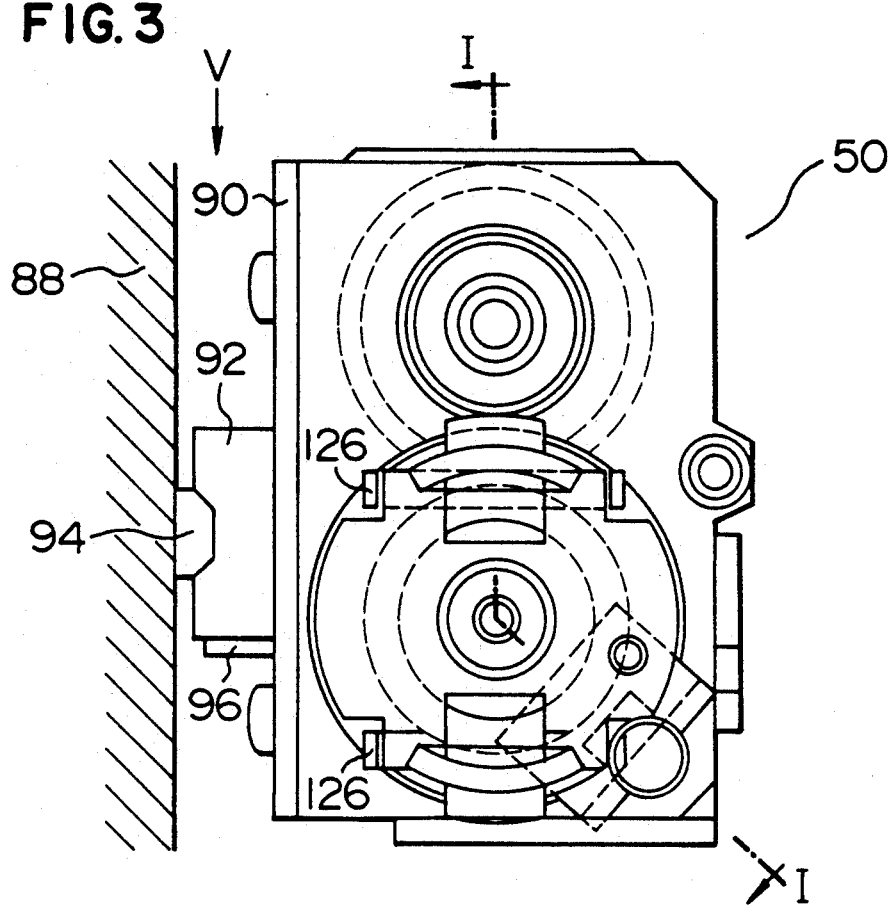
FIG. 3 is a front view illustrating an actuator unit shown in FIG. 1.
Figure 4:
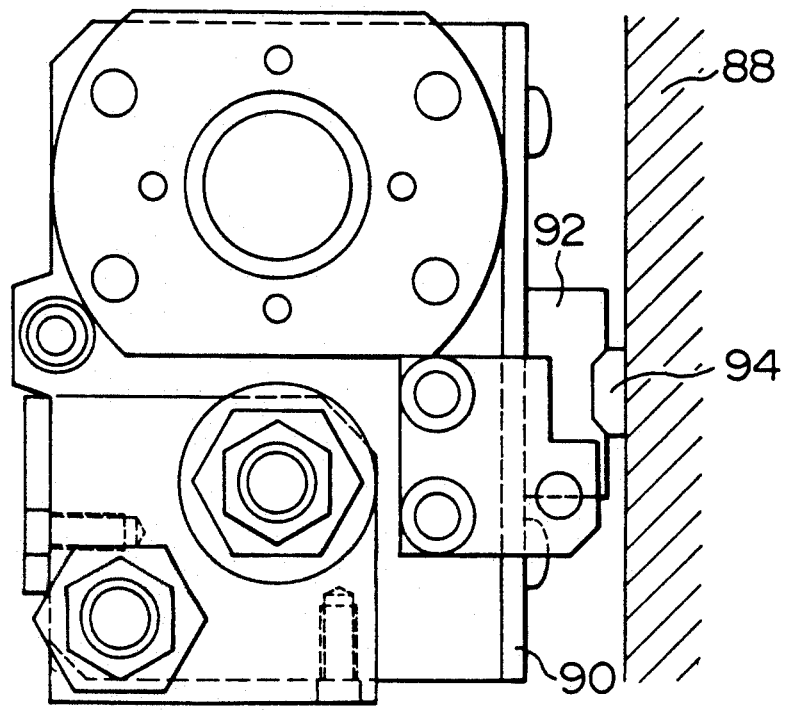
FIG. 4 is a rear view of the actuator unit shown in FIG. 1.
Figure 5:
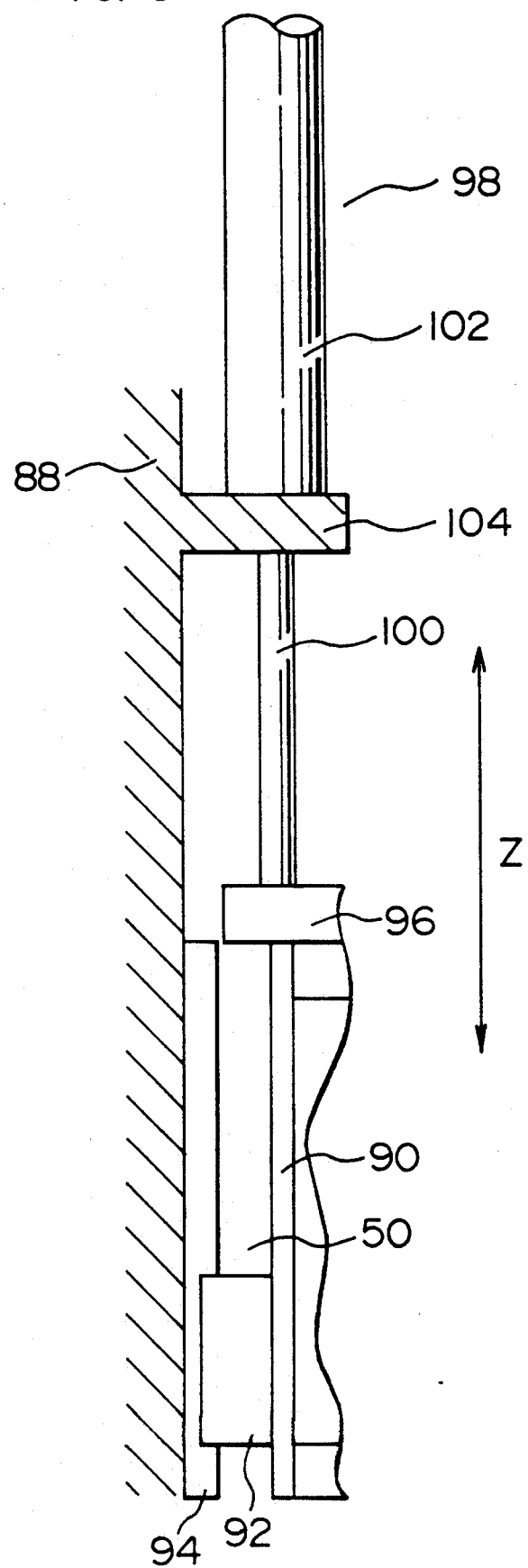
FIG. 5 is a sectional view along line V—V in FIG. 3.

Referring to FIGS. 3 to 5, a mechanism for moving the actuator section 50 forward and backward in the Z-axial direction relative to the base 88 will be described below. A linear guide 92 is provided, being projected from the side of a plate 90 which serves as a strength member of the actuator section 50, and a rail 94 engaging with the linear guide 92 is mounted on the base 88. A connecting plate 96 serving as a strength member of the actuator section 50 is connected with the tip portion of a piston rod 100 of a Z-axial direction cylinder 98. A cylinder body 102 of the Z-axial direction cylinder 98 is fixed to a flange portion 104 of the base 88. In consequence, by supplying air to the cylinder body 102, it becomes possible to move the actuator section 50 forward or backward in the Z-axial direction relative to the base 88.

Figure 2:
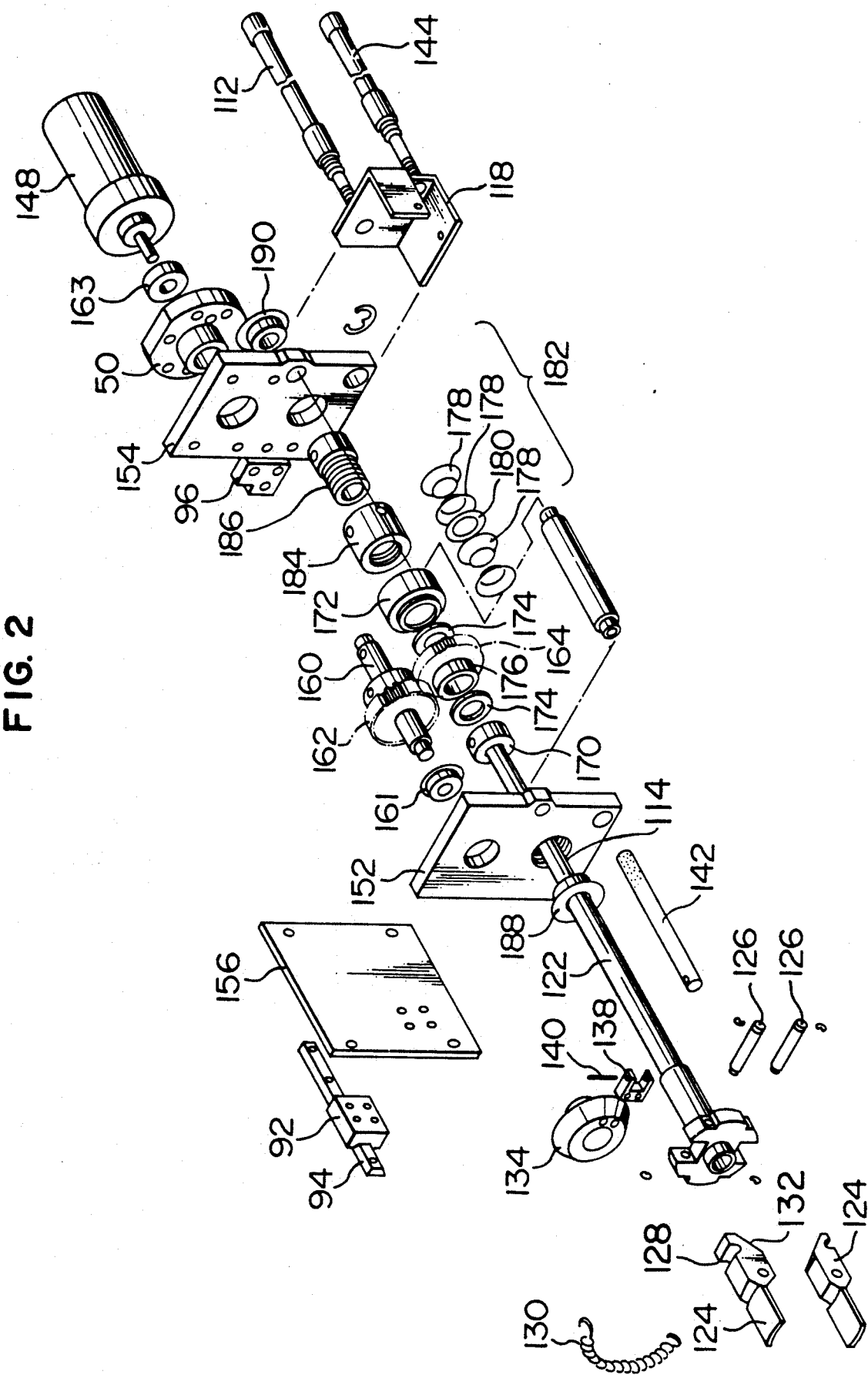
FIG. 2 is an exploded perspective view illustrating the actuator unit shown in FIG. 1.

Next, referring to FIGS. 1 and 2, the actuator section 50 will be explained below. The actuator section 50 is composed of a pusher device 106 pushing a push button which is not shown, a chuck device 108 chucking a dial knob which is not shown, and a rotation control device 110 for rotating the chuck device.

The pusher device 106 is adapted to move a push rod 114 forward or backward by means of an air cylinder 112. A cylinder body 116 of the air cylinder 112 is fixed to an angle 118 serving as a strength member of the actuator section, and a piston rod 120 of the air cylinder 112 is connected with an end of the push rod 114. Further, a soft member is fixed to the tip portion of the push rod 114 so that a push button switch which is not shown may suffer no damage when the push rod contacts with the push button.

The chuck device 108 includes a pair of chuck pawls 124 facing each other, which are mounted on the tip portion of a hollow main shaft 122 arranged on the outer surface of the push rod 114 coaxially therewith.

Each of the chuck pawls 124 is connected with the main shaft 122 by means of a connecting pin 126 in such a manner as to allow the chuck pawl to rotate by a predetermined angle and to take an opening and closing motion. On the outer surface of the rear portion of each chuck pawl is formed a groove 128, in which a ring spring 130 is inserted. The ring spring 130 maintains the chuck pawls in the open positions. Further, inside of the rear portion of each chuck pawl is formed a tapered surface 132. On the outer surface of the main shaft 122 is arranged a slider 134 which is slidable in the axial direction, and on the front portion of the slider 134 is formed a tapered surface 136, which has a shape similar to that of the tapered surface 132 so that the slider can push the tapered surface of the chuck pawls. These tapered surfaces 132, 136 may be constituted by a part of a conical surface or by flat planes. The slider 134 is connected to the tip portion of a connecting rod 142 through a connecting plate 138 and a connecting piece 140. In consequence, when air is supplied to the air cylinder 144, the slider 143 is moved by the piston rod 146 and the connecting rod 142, thereby pushing the chuck pawls 124 through the tapered surfaces 132, 136 and closing the chuck pawls. When the slider retards, the chuck pawls 124 return to open positions by the help of the ring spring 130.

Next, the rotation control device 110 will be described below. The rotation driving source for the rotation control device is a motor 148, which is fixed to a housing 150 serving as a strength member of the actuator section 50. Strength members of the actuator section 50 include a front plate 152, a rear plate 154, an outer plate 156 connecting the front and rear plates, a housing 150 fixed to the rear plate 154, and an angle 118 fixed to the rear portion of the housing 150. The rotary shaft 158 of the motor 148 is coaxially connected with a shaft 160, on the periphery of which is fixed a gear 162. Both ends of the shaft 160 are supported by the front plate 152 and the housing 150 through a bearing 161 and a bearing 163, respectively. The gear 162 meshes with a gear 164 mounted on the periphery of the main shaft 122.

In the region where a rotation force is transmitted from the gear 164 to the main shaft 122 is provided a torque adjusting mechanism 168 utilizing sliding surfaces. In detail, in front of the gear 164, a hub 170 is fixed to the main shaft 122, while in the rear of the gear 164 is provided a holder 172. Between the gear 164 and the hub 170 and between the gear 164 and the holder 172 are disposed friction plates 174, while between the gear 164 and the main shaft 122 is disposed a plain bearing 176. These friction members 174 and plain bearing 176 are applied with a Teflon coating so as to provide sliding friction surfaces. The holder 172 has a U-shaped cross-section, inside of which is accommodated a spring mechanism including Bellerville springs 178 and washer-like plates 180 combined alternatively. For pushing the spring mechanism 182, an adjusting nut 184 is provided inside of the holder 172. The adjusting nut 184 is formed with a female screw on the inner surface of an end portion thereof, which meshes with a male screw formed on the outer surface of a boss 186. The boss 186 is fixed to the main shaft 122. The main shaft 122 is supported by the front plate 152 and the rear plate 154 through a bearing 188 and a bearing 190, respectively.

By virtue of the rotation control device 110 including the torque adjusting mechanism 168, when the rotation force of the motor 148 is transmitted to the main shaft 122 through the shaft 160, the gear 162, the gear 164, and the hub 170 with the chuck pawls 124 chucking a dial knob, and the main shaft 122 is rotated up to the position of a stopper not shown of the disk knob, slidings occurs among the sliding surfaces of the friction plates 174 and the plain bearing 176. The amount of the torque at which such sliding starts can be adjusted by controlling the surface pressure on the sliding surfaces, namely, the force urging the spring mechanism 182. The control of the urging force of the spring mechanism 182 can be conducted by rotating the adjusting nut 184, thereby changing the distance L by which the spring mechanism is pushed by the adjusting nut 184. Further, the plain bearing 176 has effects to assure the axial portion of the gear 164 and to prevent a variation of the frictional force between the gear 164 and the main shaft 122.

Figure 6:
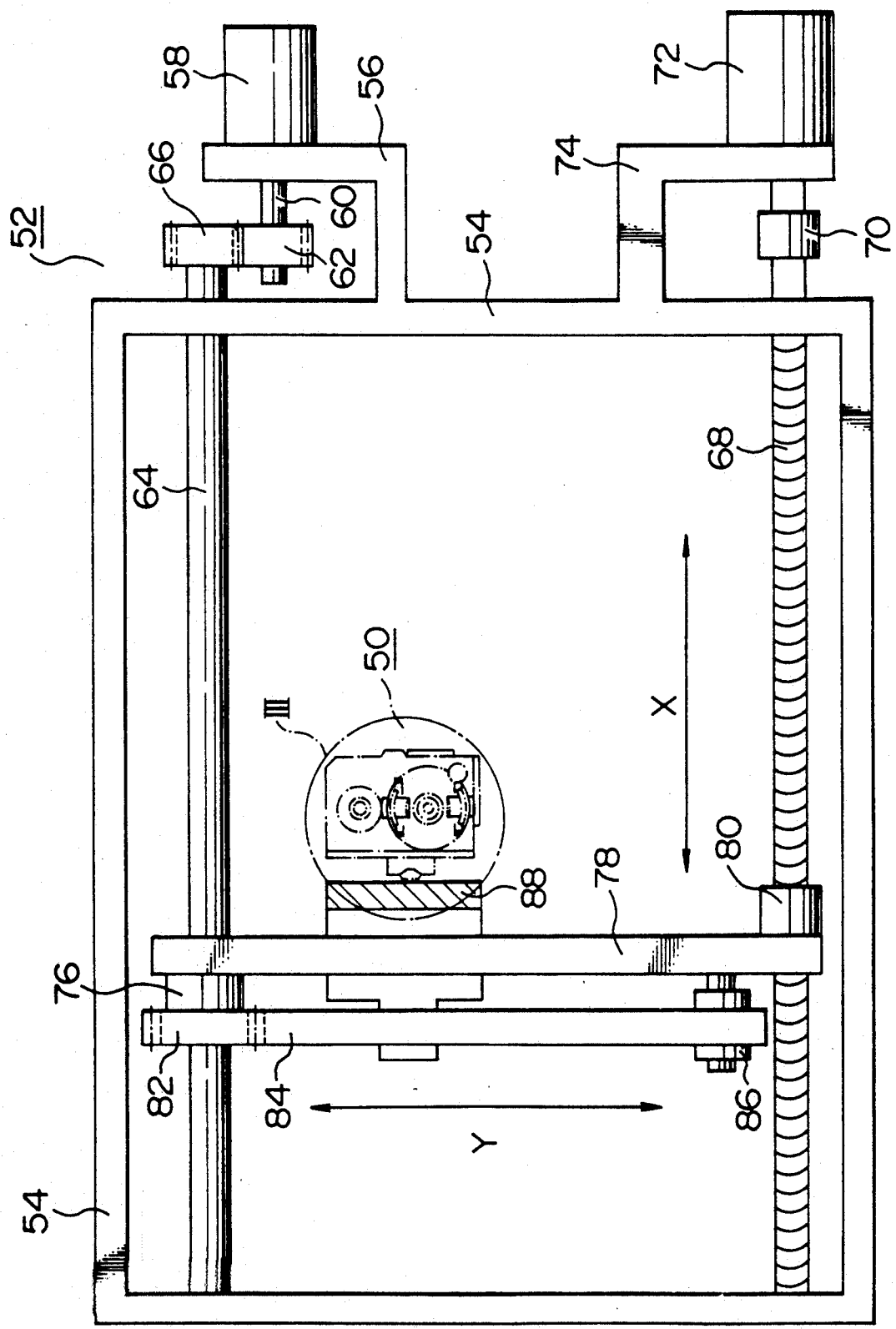
FIG. 6 is a plane view illustrating an installation of the actuator unit shown in FIG. 1.

The two motors 58, 72 shown in FIG. 6 and the air cylinder 112, 144 shown in FIG. 5 are controlled according to a program for operating the actuator unit.

The operation of this embodiment will be described below. When a product to be adjusted or inspected has been transferred as disposed on a production line conveyer, the motors 58, 72 are rotated so as to rapidly moving the actuator section 50 in X- and Y-axial directions to a position where the actuator section 50 faces a push button switch or a disk knob.

When the actuator section 50 reaches a position opposite to a push button switch which is not shown, the air cylinder 112 is operated, thereby pressing the push rod 114 forward and pushing the push button switch. After this, the push rod 114 is moved backward, and the two motors 58, 72 of the X-Y axial servo mechanism 52 are rotated, thereby moving the actuator section 50 to a next position corresponding to a next push button switch. After this, the same processes are repeated, and all of the push button switches are inspected as to whether they can function correctly or not.

When the actuator section reaches a position opposite to a dial knob, the Z-axial air cylinder 98 is operated, thereby moving the actuator section 50 forward and positioning the chuck pawls 124 beside the dial knob. After this, the air cylinder 144 shown in FIG. 1 is operated, thereby sliding the slider 134 forward, pushing the tapered surfaces 132, 136, and closing the chuck pawls 124 while chucking the dial knob. Then, the motor 148 is operated, thereby rotating the main shaft 122 through the shaft 160, the gear 162, the gear 164 and the hub 170, and the chuck pawls 124 rotates the dial knob. In the rotation of the main shaft, when the torque to be transmitted to the main shaft increases beyond a predetermined value, sliding motion occurs on the sliding surfaces of the friction plates 174 and the plain bearing 176, thereby limiting the torque to be transmitted within the predetermined value. The adjusting of this limit torque value can be easily carried out by rotating the adjusting nut 184 relative to the boss 186 by use of a tool such as a spanner. Further, there may be provided a torque adjusting mechanism including a motor and gears or the like, for rotating and displacing the adjusting nut 184 in order to adjust the torque value of the chuck pawls 124.

As mentioned above, according to this embodiment, the push rod 114 and the main shaft 122 are arranged coaxially, in other words, the pusher device 106 and the chuck device 108 are arranged on a common axis. As a result, the size of the actuator section 50 can be made small as a whole. By virtue of the decreased size it becomes easy to mount the actuator section 50 on the X-Y biaxial servo mechanism 52. Thus, the weight and volume of the actuator section 50 can be decreased, and the size and required strength of the X-Y biaxial servo mechanism 52 can be also decreased, thereby making it possible to use motors 58, 72 each having a small capacity and a small size.

Since the actuator section 50 can be rapidly moved by the X-Y biaxial servo mechanism 52 in X- and Y-axial directions, it is not required to provide a plurality of pusher devices, a plurality of chuck devices, and further, a plurality of rotation control devices, which are indispensable in the prior art. This means, a single set of a pusher device 106, a chuck device 108, and a rotation control device 110 can deal with a plurality of push button switches or dial knobs. Further, in case the product is replaced and the number or the position of the push button switch or the dial knob is changed, it is not necessary to replace the pusher device 106, a chuck device 108, or a rotation control device 110, but the same devices can be continuously used.

The chucking diameter of the chuck pawls 124 can be easily adjusted by controlling the slide amount of the slider 134 in the axial direction. Since this slide amount can be simply adjusted by means of the air cylinder 144, the process of changing the chucking diameter can be easily incorperated into the computer program for operating the actuator unit.

Further, even when the dial knob is going to be erroneously rotated beyond the position of the stopper (not shown), sliding occurs among the sliding surfaces of the friction plate 174 and the plain bearing 176, thereby preventing an excessive torque from acting on the dial knob. In addition, in case the product is replaced and the appropriate torque for the dial knob changes, the new appropriate torque can be easily obtained by adjusting the pressing force of the spring mechanism 182 by rotating the adjusting nut 184, thereby controlling the surface pressures on the sliding surfaces.

As mentioned above, when the product is replaced and the number or the position of the push button switch or the dial knob is changed, or the appropriate torque for the dial knob is changed, it is not necessary to replace the pusher device, the chuck device, or the rotation control device. As a result, the timing loss of the operation is eliminated or greatly decreased. Further, since the pusher device 106 and the chuck device 108 are arranged coaxially, it becomes easy to prepare a computer program for operating the X-Y biaxial servo device 52 and moving the actuator section 50 in a desired direction in a X-Y plate.

Figure 7:
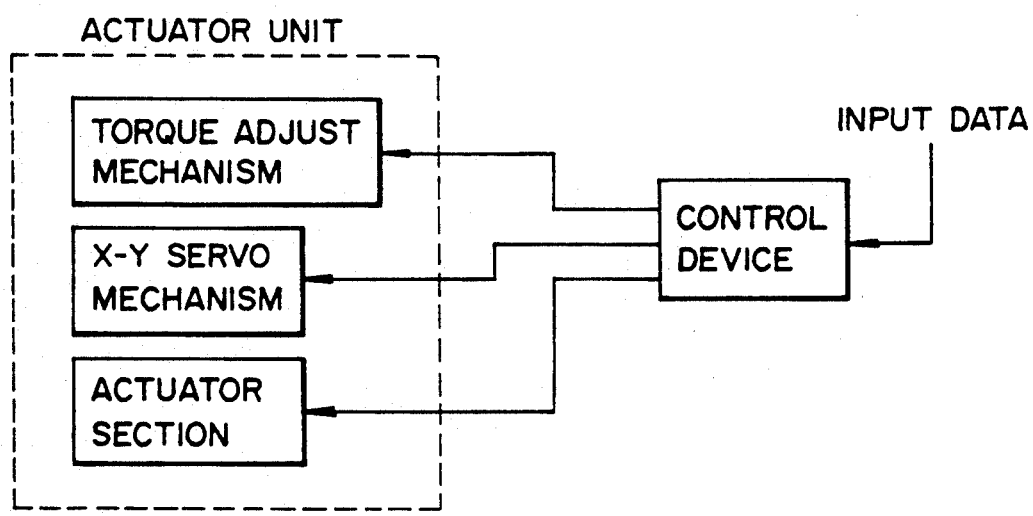
FIG. 7 is a block diagram illustrating a control system for operating the installation shown in FIG. 6.
Figure 8:
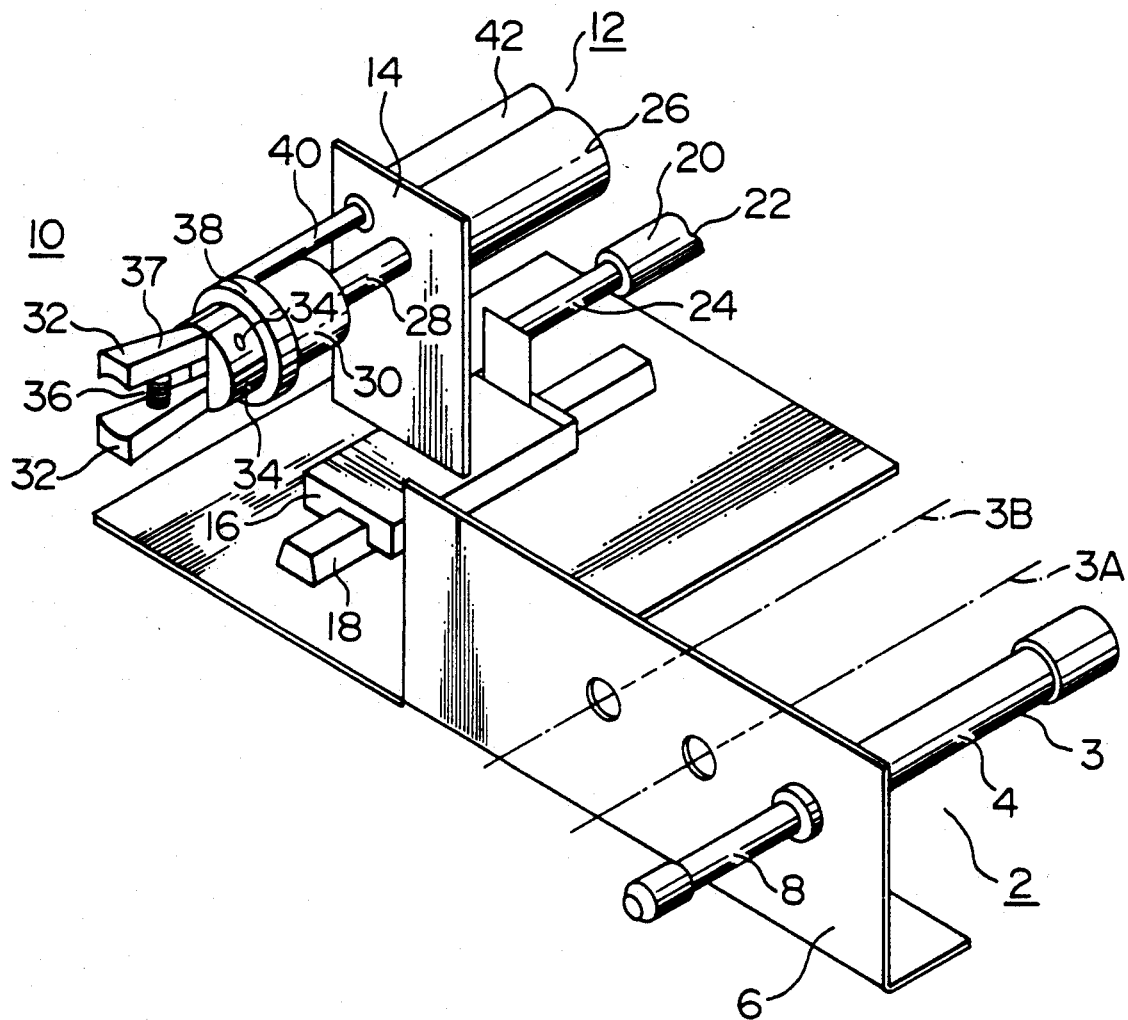
FIG. 8 is a perspective view illustrating a conventional actuator unit.

FIG. 7 shows a control system for controlling the actuator unit. In this figure, there is shown a control device which incorporates therein several kinds of programs for controlling the torque adjusting mechanism, the X-Y axis servo mechanism and the actuator section. The control device receives data concerning a product to be adjusted and checked on the line conveyer, and delivers control signals for adjusting the chuck pawl torque, the position of the actuator section and for controlling the operation of the actuator section.

As is apparent from the embodiment mentioned above, in an actuator unit according to the present invention, the size of the actuator section is made small by arranging the push rod of the pusher device and the main shaft of the chuck device in a coaxial manner, and by virtue of the small size of the actuator section, the actuator section can be easily mounted on the X-Y biaxial servo mechanism, and can be rapidly moved by the servo mechanism to a desired position defined in X- and Y-axis directions. Therefore, in such case that the product includes a plurality of button switches or dial knobs, or the position or number of the button switches or the dial knobs of the product is changed, the product can be dealt with by a single set of a pusher device, a chuck device and a rotation control device. In consequence, it is not required to provide a number of pusher devices, chuck devices and rotation control devices corresponding to the number of push button switches and the dial knobs of the product. Further, even where the position or number of the button switches or the dial knobs of the product are changed, there is required no design change or fabrication process change for changing the number or the positions of the pusher devices, the chuck devices and the rotation control devices. It is not necessary to variously set the chucking diameter of the chuck pawls in advance for coping with different dial knobs, because the chucking diameter can be easily changed by changing the slide amount of the slider.

The dial knob is protected from an excessive torque because the rotation torque is transmitted through sliding surfaces, and can be easily adjusted by controlling the surface pressure on the sliding surfaces by means of the spring. As a result, it is not necessary to change the rotation control motor every time when the rotation torque of the dial knob is changed.

What is claimed is:

1. An automatically adjusting actuator unit for adjusting pushbutton controls and rotary controls on product equipment that is transported on a conveyor positioned adjacent to said unit, said unit comprising:
    a base member mounted on an X-Y biaxial servo mechanism and movable both in X- and Y-axial directions, and
    an actuator section mounted on said base member and movable in a Z-axial direction relative to said base member and including a pusher means for selectively pushing individual ones of said push button controls of said product and a chuck means for selectively chucking individual ones of said rotary controls of said product equipment, and a rotation control means for rotating said chuck means, wherein said pusher means includes a push rod movable in a Z-axial direction, and said chuck means includes a hollow main shaft coaxially arranged on an outer surface of said push rod and having a tip portion, a plurality of chuck pawls attached at said tip portion of said main shaft in opposed relationship to each other so as to be swingable relative to said main shaft, and an opening degree changing means including a slider slidable in said X-axial direction and formed with a tapered surface at a front portion thereof for pressing against tapered surfaces formed on rear portions of said chuck pawls, whereby said chuck pawls are closeable to grip selectively individual ones of said rotary controls.

2. An automatically adjusting actuator unit for adjusting pushbutton controls and rotary controls on product equipment that is transported on a conveyor positioned adjacent to said unit, said unit comprising:
    a base member mounted on an X-Y biaxial servo mechanism and movable both in X- and Y-axial directions, and
    an actuator section mounted on said base member and movable in a Z-axial direction relative to said base member and including a pusher means for selectively pushing individual ones of said push button controls of said product and a chuck means for selectively chucking individual ones of said rotary controls of said product equipment, and a rotation control means for rotating said chuck means, wherein said chuck means includes a main shaft, and said rotation control means comprises a torque transmitting means for transmitting a torque to the main shaft through a friction means, said friction means frictionally engaging with said main shaft with a friction engaging force, and a torque adjusting means for adjusting the friction engaging force, and an urging means for applying an urging force to said torque adjusting means so that said friction engaging force is applied to said main shaft.

* * * * *